United States Patent
Kaneko et al.

(10) Patent No.: US 9,694,775 B2
(45) Date of Patent: Jul. 4, 2017

(54) BUMPER STRUCTURE

(71) Applicants: AISIN SEIKI KABUSHIKI KAISHA, Kariya-shi, Aichi-ken (JP); AISIN KEIKINZOKU KABUSHIKI KAISHA, Imizu-shi, Toyama-ken (JP)

(72) Inventors: Takanobu Kaneko, Kariya (JP); Kiyoichi Kita, Okazaki (JP); Jun Shobo, Anjo (JP); Yuta Takanami, Chiryu (JP)

(73) Assignees: Aisin Seiji Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 0 days.

(21) Appl. No.: 15/081,172

(22) Filed: Mar. 25, 2016

(65) Prior Publication Data
US 2016/0280167 A1    Sep. 29, 2016

(30) Foreign Application Priority Data

Mar. 26, 2015    (JP) .................................. 2015-064825

(51) Int. Cl.
*B60R 19/02*    (2006.01)
*B60R 19/34*    (2006.01)
*B60R 19/18*    (2006.01)

(52) U.S. Cl.
CPC .............. *B60R 19/34* (2013.01); *B60R 19/18* (2013.01); *B60R 2019/182* (2013.01)

(58) Field of Classification Search
CPC ........ A47B 96/021; B65D 2543/00629; B65D 2543/00685; B65D 2543/00796;
(Continued)

(56) References Cited

U.S. PATENT DOCUMENTS 6,957,846 B2 *   10/2005   Saeki ................... B62D 21/152
                                                180/232
7,134,700 B2 *   11/2006   Evans ..................... B60R 19/18
                                                293/120
(Continued)

FOREIGN PATENT DOCUMENTS

JP        2014-113893        6/2014

*Primary Examiner* — Kiran B Patel
(74) *Attorney, Agent, or Firm* — Finnegan, Henderson, Farabow, Garrett & Dunner, LLP (57) ABSTRACT

A bumper structure includes: a bumper reinforcement including: a hollow body portion extending in a vehicle width direction of a vehicle; and an extending portion arranged on one end portion of the hollow body portion in a longitudinal direction of the hollow body portion; and a side member, which is formed to extend in a vehicle front-and-rear direction of the vehicle, and is configured to support one end portion of the bumper reinforcement in a longitudinal direction of the bumper reinforcement. The extending portion includes: a proximal end portion to be sandwiched between the one end portion of the hollow body portion in the longitudinal direction of the hollow body portion and one end portion of the side member in a longitudinal direction of the side member; and a protruding portion formed to extend outward from the proximal end portion in the vehicle width direction. The side member includes a projecting portion protruding outward in the vehicle width direction. When an object collides against one end portion of the vehicle in the vehicle width direction to break the one end portion of the side member in the longitudinal direction of the side member, the protruding portion of the extending portion is abuttable against the projecting portion of the side member.

6 Claims, 8 Drawing Sheets

(58) Field of Classification Search
CPC ....... B65H 2701/31; B60R 9/06; B60R 19/18; B60R 19/02; B60D 1/56; B60P 3/125
USPC ................................. 293/102, 117, 120, 155
See application file for complete search history.

(56) References Cited

U.S. PATENT DOCUMENTS

| | | | | |
|---|---|---|---|---|
| 8,608,231 B1* | 12/2013 | Mendivil | ............... | B60R 19/34 293/133 |
| 8,720,961 B2* | 5/2014 | Han | ................ | B60R 19/34 293/133 |
| 8,764,096 B2* | 7/2014 | Han | ................ | B60R 19/18 296/133 |
| 8,801,083 B2* | 8/2014 | Miyashita | ............ | B62D 21/152 296/187.1 |
| 8,985,671 B1* | 3/2015 | Lei | ................ | B60R 19/04 296/133 |
| 9,045,100 B2* | 6/2015 | Kaneko | ............... | B60R 19/34 |
| 9,061,713 B2* | 6/2015 | Hashimoto | ........... | B62D 21/152 |
| 9,102,289 B2* | 8/2015 | Braunbeck | ............. | B60R 19/34 |
| 9,180,828 B2* | 11/2015 | Sakakibara | ............. | B60R 19/34 |
| 9,187,053 B2* | 11/2015 | Nusier | ................ | B60R 19/34 |
| 9,199,591 B2* | 12/2015 | Weil | ................ | B60R 19/34 |
| 9,211,915 B2* | 12/2015 | Abe | ................ | B62D 21/152 |
| 9,242,675 B2* | 1/2016 | Kuriyama | ............ | B62D 25/082 |
| 9,266,485 B2* | 2/2016 | Kuriyama | ............... | B60R 19/34 |
| 9,272,678 B2* | 3/2016 | Nam | ................ | B60R 19/04 |
| 9,290,138 B2* | 3/2016 | Muraji | ................ | B62D 21/152 |
| 9,308,881 B2* | 4/2016 | Bobba | ................ | B60R 19/56 |
| 9,327,665 B2* | 5/2016 | Barbat | ................ | B60R 19/34 |
| 9,333,928 B2* | 5/2016 | Eckert | ................ | B62D 25/082 |
| 9,352,711 B2* | 5/2016 | Hoiss | ................ | B62D 21/152 |
| 9,399,438 B2* | 7/2016 | Braunbeck | ............. | B60R 19/04 |
| 9,399,487 B2* | 7/2016 | Fujita | ................ | B62D 21/11 |
| 9,415,735 B1* | 8/2016 | Baccouche | ............. | B60R 19/34 |
| 9,457,746 B1* | 10/2016 | Baccouche | ............. | B60R 19/34 |
| 9,481,334 B1* | 11/2016 | Matsumoto | ............. | B60R 19/34 |
| 9,499,111 B2* | 11/2016 | Watanabe | ............... | B60R 19/24 |
| 9,517,799 B2* | 12/2016 | Matsumoto | ............. | B62D 25/08 |
| 9,527,463 B2* | 12/2016 | Ramoutar | ............... | B60R 19/16 |
| 9,539,966 B2* | 1/2017 | Kato | ................ | B62D 21/152 |
| 9,545,951 B2* | 1/2017 | Ono | ................ | B62D 21/11 |
| 9,550,463 B2* | 1/2017 | Hara | ................ | B60R 19/34 |
| 2015/0314742 A1 | 11/2015 | Kato et al. | | |

\* cited by examiner

BUMPER STRUCTURE

CROSS REFERENCE TO RELATED APPLICATIONS

This application is based on and claims priority under 35 U.S.C. §119 to Japanese Patent Application 2015-64825, filed on Mar. 26, 2015, the entire content of which is incorporated herein by reference.

TECHNICAL FIELD

The present disclosure relates to a bumper structure for a vehicle.

BACKGROUND DISCUSSION

Hitherto, as disclosed in Japanese Patent Application Laid-open No. 2014-113893, there is known a bumper structure for absorbing shock caused when an object collides against a front end (or a rear end) of a vehicle during travel of the vehicle. The bumper structure includes a pair of right and left side members formed to extend in a vehicle front-and-rear direction, and a bumper reinforcement formed to extend in a vehicle width direction in front of (or behind) the side members. The length of this bumper reinforcement is set larger than an interval between the right and left side members. That is, a right end portion of the bumper reinforcement is located on a right side with respect to the right side member. On the other hand, a left end portion of the bumper reinforcement is located on a left side with respect to the left side member. Projecting members are fixed to rear surfaces of the right end portion and the left end portion of the bumper reinforcement, respectively. Further, projecting members are also fixed to a left surface of the left side member and a right surface of the right side member, respectively, When the object collides into a small region of the vehicle on one end side in the vehicle width direction (for example, a part in a range from a portion located in front of (or behind) the side member to one end of the vehicle in the vehicle width direction) from the front side (or the rear side) (hereinafter referred to as small overlap collision), a distal end portion of the side member is compressed in a longitudinal direction. Then, the projecting member of the bumper reinforcement and the projecting member of the side member are brought into abutment against each other. An inclined surface is formed on a front end surface of the projecting member of the side member. The inclined surface is pressed by the projecting member of the bumper reinforcement so that a load, which is applied inward in the vehicle width direction, acts on the side member. Then, the distal end portion of the side member is bent inward in the vehicle width direction to be brought into abutment against a power unit (engine, transmission, or the like). Further, the power unit is pressed by the side member. With this, a vehicle body is moved in the vehicle width direction. That is, a vehicle cabin can be moved away from the object.

In the above-mentioned related-art vehicle, in order to cope with the small overlap collision, the length of the bumper reinforcement is set larger than the interval between the right and left side members. In general, the bumper reinforcement is formed to be curved in conformity with a shape of a decorative member (bumper cover) arranged on a front end portion (or a rear end portion) of the vehicle. For example, the bumper reinforcement is formed by extruding a metal material, and bending an intermediate body formed straight. However, it is difficult to significantly and locally bend the right and left end portions of the bumper reinforcement. Therefore, a shape of the bumper cover needs to be determined in consideration of a shape of the right and left end portions of the bumper reinforcement. That is, the degree of freedom is low in designing the front end portion (or the rear end portion) of the vehicle.

Further, the projecting member of the above-mentioned related-art bumper reinforcement is made of metal, and is formed into a block shape (solid). Therefore, the weight of the right and left end portions of the front end portion (rear end portion) of the vehicle is large. Consequently, the steering stability of the vehicle may be degraded.

SUMMARY

A need thus exists for a bumper structure which is not susceptible to the drawback mentioned above. Note that, in the following description of respective components of the present disclosure, for the sake of better understanding of the present disclosure, the respective components are denoted by parenthesized reference symbols that represent corresponding components according to an embodiment of the present disclosure. However, the respective components of the present disclosure should not be limitedly understood by configurations of the corresponding components denoted by the reference symbols of the embodiment.

A feature of the present disclosure resides in a bumper structure (1), including: a bumper reinforcement (20) including: a hollow body portion (30) extending in a vehicle width direction of a vehicle; and an extending portion (40L (40R)) arranged on one end portion of the hollow body portion in a longitudinal direction of the hollow body portion; and a side member (10L (10R)), which is formed to extend in a vehicle front-and-rear direction of the vehicle, and is configured to support one end portion of the bumper reinforcement in a longitudinal direction of the bumper reinforcement, in which the extending portion includes: a proximal end portion (50L (50R)) to be sandwiched between the one end portion of the hollow body portion in the longitudinal direction of the hollow body portion and one end portion of the side member in a longitudinal direction of the side member; and a protruding portion (60L (60R)) formed to extend outward from the proximal end portion in the vehicle width direction, in which the side member includes a projecting portion (13L (13R)) protruding outward in the vehicle width direction, and in which, when an object collides against one end portion of the vehicle in the vehicle width direction to break the one end portion of the side member in the longitudinal direction of the side member, the protruding portion of the extending portion is abuttable against the projecting portion of the side member.

DETAILED DESCRIPTION

Figure 1:
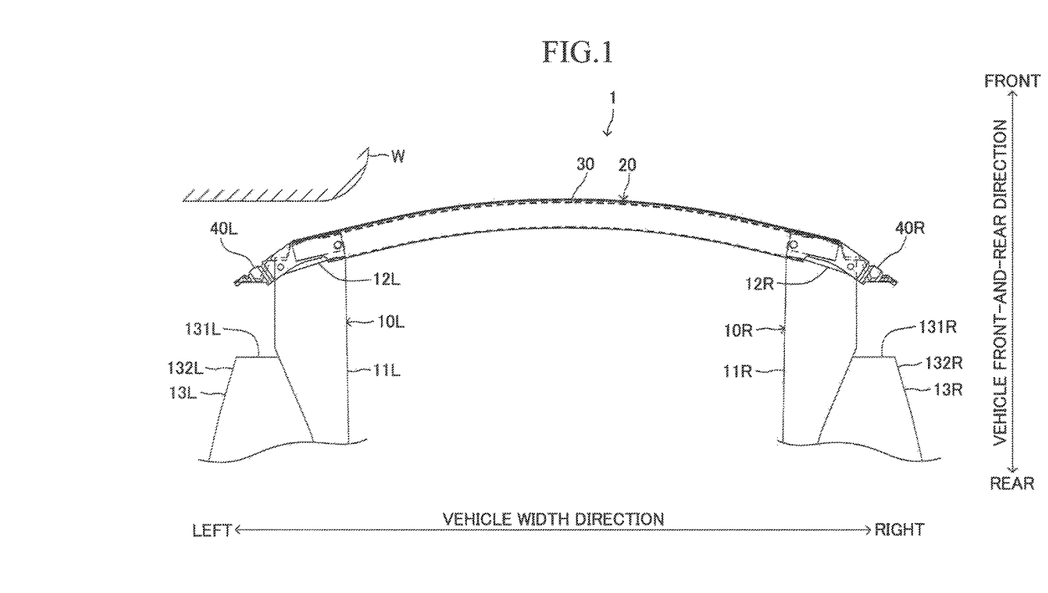
FIG. 1 is a plan view of a bumper structure according to the present disclosure.

A bumper structure 1 according to an embodiment of the present disclosure is described. As illustrated in FIG. 1, the bumper structure 1 includes a pair of side members 10L and 10R, and a bumper reinforcement 20. The side members 10L and 10R are arranged with an interval in a vehicle width direction, and are each formed to extend in a vehicle front-and-rear direction.

Figure 2:
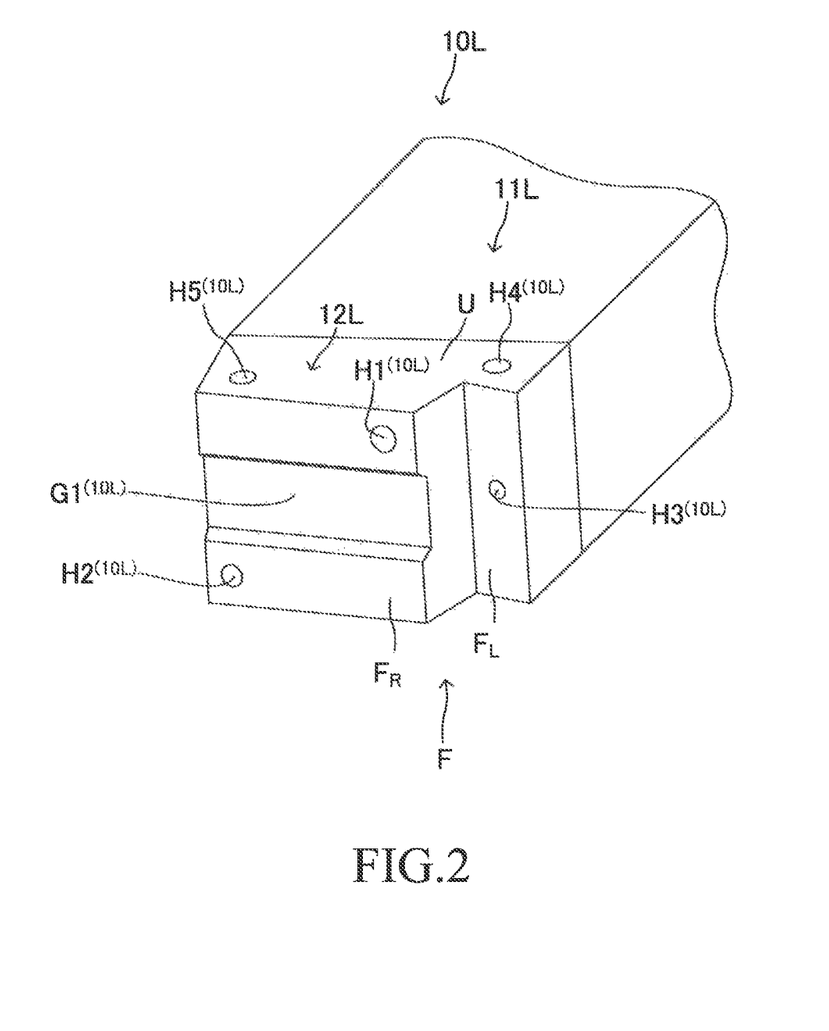
FIG. 2 is an enlarged perspective view of a front end portion of a side member.

The side members 10L and 10R are arranged on left and right end portions of a vehicle, respectively. The side member 10L includes a body portion 11L having a tubular shape and being formed to extend in the vehicle front-and-rear direction, a terminal end portion 12L covering a front end surface of the body portion 11L, and a projecting portion 13L protruding leftward from a left surface of the body portion 11L. An outer shape of the body portion 11L in a cross section perpendicular to the vehicle front-and-rear direction is a substantially rectangular shape. The terminal end portion 12L is formed into a box shape opened rearward by pressing a metal plate. As illustrated in FIG. 2, a front wall portion F forming a front surface of the terminal end portion 12L includes a right front wall portion $F_R$ located on the right side, and a left front wall portion $F_L$ located on the left side. The right front wall portion $F_R$ is formed into a flat plate shape inclined so that an outer portion in the vehicle width direction is located rearward with respect to an inner portion in the vehicle width direction. Further, the left front wall portion $F_L$ is formed into a flat plate shape perpendicular to the vehicle front-and-rear direction. The left front wall portion $F_L$ is located rearward with respect to the right front wall portion $F_R$. That is, a step is formed between the left front wall portion $F_L$ and the right front wall portion $F_R$. Further, a groove portion $G1^{(10L)}$ extending in the vehicle width direction is formed in a center portion of a front surface of the right front wall portion $F_R$ in a vehicle height direction. Further, in front view of the right front wall portion $F_R$ (in a state when viewed from the front side), a through hole $H1^{(10L)}$ and a through hole $H2^{(10L)}$ are formed in an upper right corner portion and a lower left corner portion, respectively. A through hole $H3^{(10L)}$ is formed in a center portion of the left front wall portion $F_L$. Further, a through hole $H4^{(10L)}$ and a through hole $H5^{(10L)}$ are formed in left and right end portions of an upper wall portion U forming an upper surface of the terminal end portion 12L, respectively. Nuts (not shown) are fixed (welded) at positions of a rear surface of the front wall portion F of the terminal end portion 12L and a lower surface of the upper wall portion U, at which the respective through holes are formed, respectively. That is, distal ends of bolts inserted into the respective through holes can be fastened to the respective nuts from a front surface side of the front wall portion F or an upper surface side of the upper wall portion U.

The projecting portion 13L is mounted on the left surface of the body portion 11L. That is, the projecting portion 13L protrudes leftward from the left surface of the body portion 11L. A front end surface 131L of the projecting portion 13L is formed into a flat surface shape perpendicular to the vehicle front-and-rear direction. Further, the projecting portion 13L has an inclined surface 132L extending rearward and leftward from a left end of the front end surface 131L.

The side member 10L and the side member 10R are bilaterally symmetrical with each other. That is, the side member 10R includes a body portion 11R having a shape bilaterally symmetrical with the body portion 11L, and a terminal end portion 12R having a shape bilaterally symmetrical with the terminal end portion 12L. The terminal end portion 12R has through holes $H1^{(10R)}$ to $H5^{(10R)}$ similar to the through holes $H1^{(10L)}$ to $H5^{(10L)}$, respectively. Further, a projecting portion 13R having a shape bilaterally symmetrical with the projecting portion 13L is mounted on a right surface of the body portion 11R. The bumper reinforcement 20 is mounted on front ends of the side members 10L and 10R formed as described above.

Figure 3:
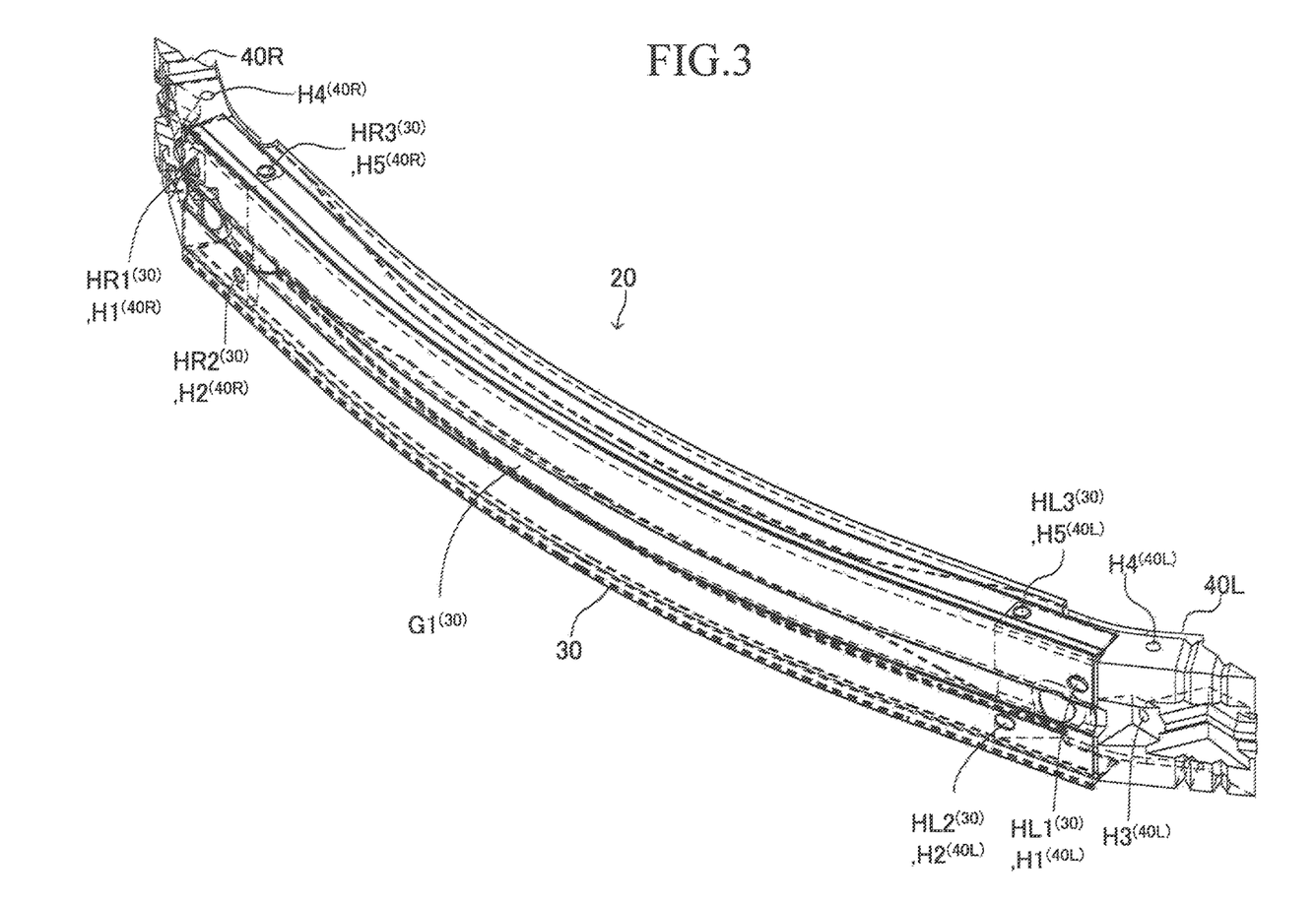
FIG. 3 is a perspective view of a bumper reinforcement and extending portions.
Figure 4:
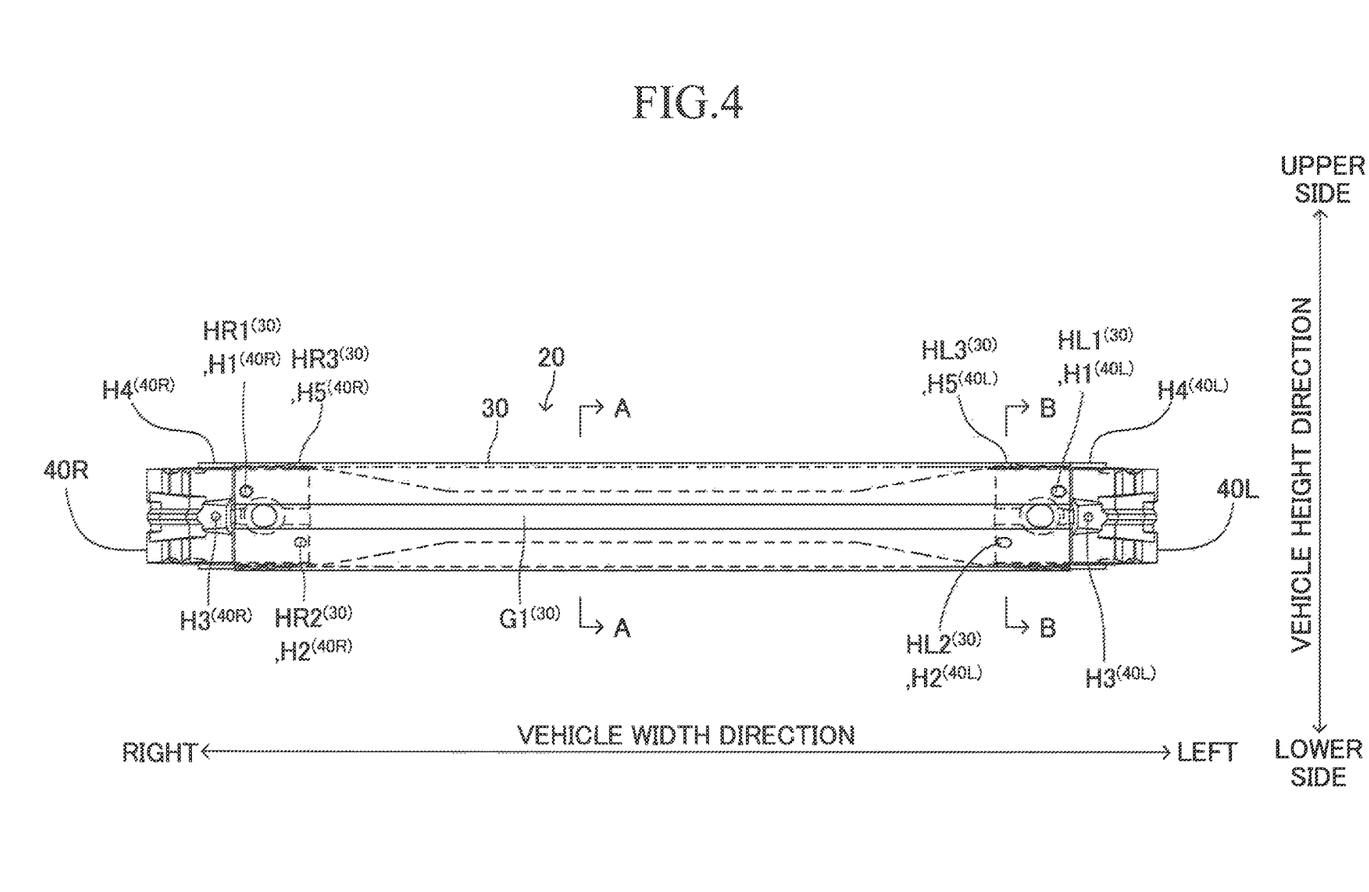
FIG. 4 is a front view of the bumper structure.
Figure 5:
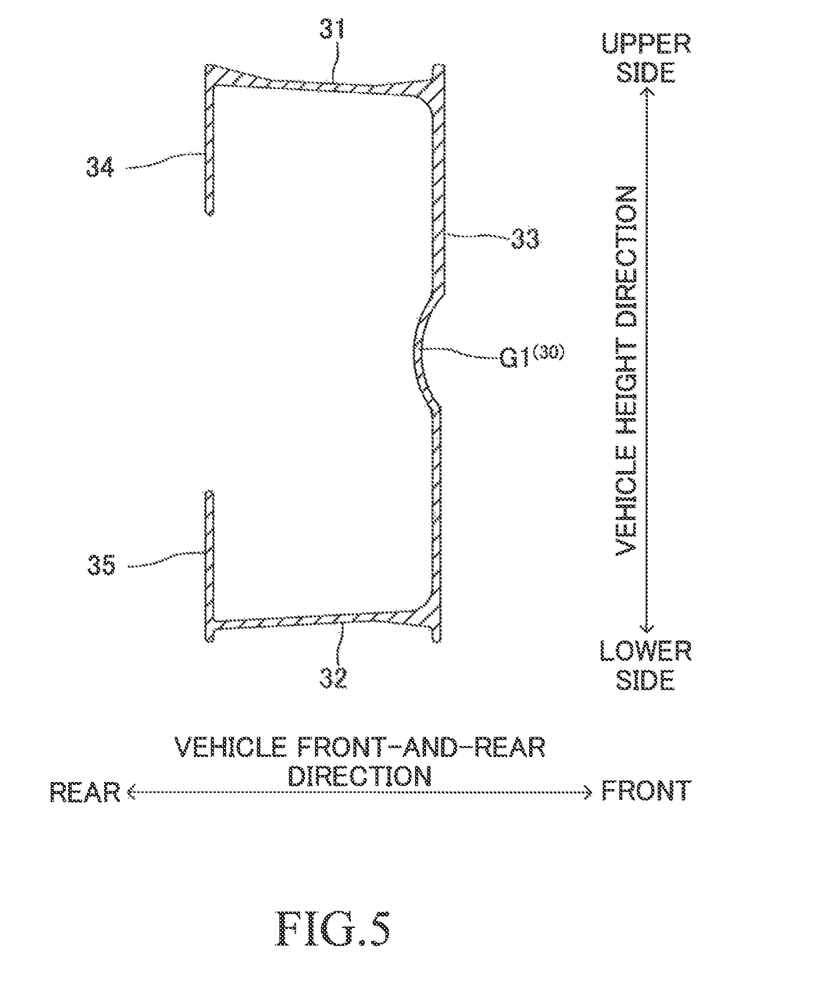
FIG. 5 is a sectional view taken along the line A-A of FIG. 4.
Figure 6:
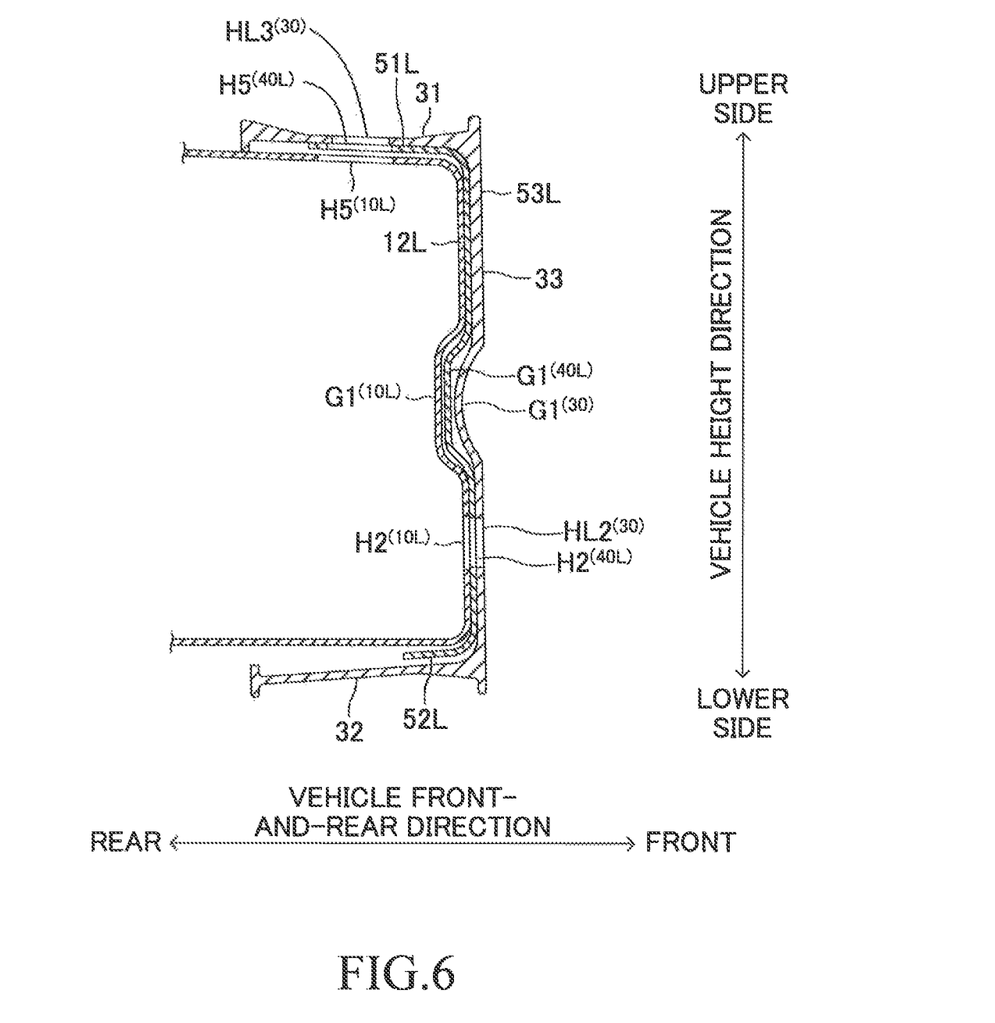
FIG. 6 is a sectional view taken along the line B-B of FIG. 4.

As illustrated in FIG. 3 and FIG. 4, the bumper reinforcement 20 includes a body portion 30 and extending portions 40L and 40R. The body portion 30 is formed to extend in the vehicle width direction. In plan view, a center portion of the body portion 30 in the vehicle width direction is curved into an arch shape (see FIG. 1). That is, an outer portion of the body portion 30 in the vehicle width direction is located slightly rearward with respect to an inner portion thereof in the vehicle width direction. The curvature of the body portion 30 is determined in accordance with the design of the front end portion (shape of a bumper cover) of the vehicle. Further, both end portions of the body portion 30 in the vehicle width direction are formed to extend straight obliquely rearward. As illustrated in FIG. 5, the body portion 30 includes an upper wall portion 31, a lower wall portion 32, a front wall portion 33, an upper rear wall portion 34, and a lower rear wall portion 35. The upper wall portion 31 is formed to extend in the vehicle width direction. The upper wall portion 31 is formed into a plate shape perpendicular to the vehicle height direction. In plan view, the upper wall portion 31 is curved into an arch shape as described above. The lower wall portion 32 is located below the upper wall portion 31, and is formed into a plate shape substantially parallel to the upper wall portion 31. The shape of the lower wall portion 32 is similar to that of the upper wall portion 31. The front wall portion 33 is formed into a plate shape perpendicular to the upper wall portion 31 and the lower wall portion 32. In plan view, the front wall portion 33 is curved into an arch shape as described above. A front end of the upper wall portion 31 is connected to an upper end portion of a rear surface of the front wall portion 33. Further, a front end of the lower wall portion 32 is connected to a lower end portion of the rear surface of the front wall portion 33. A groove portion $G1^{(30)}$ extending in the vehicle width direction is formed in a center portion of a front surface of the front wall portion 33 in the vehicle height direction. The upper rear wall portion 34 and the lower rear wall portion 35 are each formed into a plate shape substantially parallel to the front wall portion 33. An upper end portion of a front surface of the upper rear wall portion 34 is connected to a rear end of the upper wall portion 31. Further, a lower end portion of a front surface of the lower rear wall portion 35 is connected to a rear end of the lower wall portion 32. A lower end surface of the upper rear wall portion 34 and an upper end surface of the lower rear wall portion 35 are opposed to each other. The upper rear wall portion 34 and the lower rear wall portion 35 are formed only on a center portion of the body portion 30 in the vehicle width direction. That is, the upper rear wall portion 34 and the lower rear wall portion 35 are not formed on each of a left end portion and a right end portion of the body portion 30 (see FIG. 6). In a left end portion of the front wall portion 33, there are formed a through hole $HL1^{(30)}$ and a through hole $HL2^{(30)}$ respectively corresponding to the through hole $H1^{(10L)}$ and the through hole $H2^{(10L)}$ of the side member 10L. Further, in a right end portion of the front wall portion 33, there are formed a through hole $H1^{(30)}$ and a through hole $H2^{(30)}$ respectively corresponding to the through hole $H1^{(10R)}$ and the through hole $H2^{(10R)}$ of the side member 10R. Further, in a left end portion of the upper wall portion 31, there is formed a through hole $HL3^{(30)}$ corresponding to the through hole $H5^{(10L)}$ of the side member 10L. Further, in a right end portion of the upper wall portion 31, there is formed a through hole $HR3^{(30)}$ corresponding to the through hole $H5^{(10R)}$ of the side member 10R.

Figure 7:
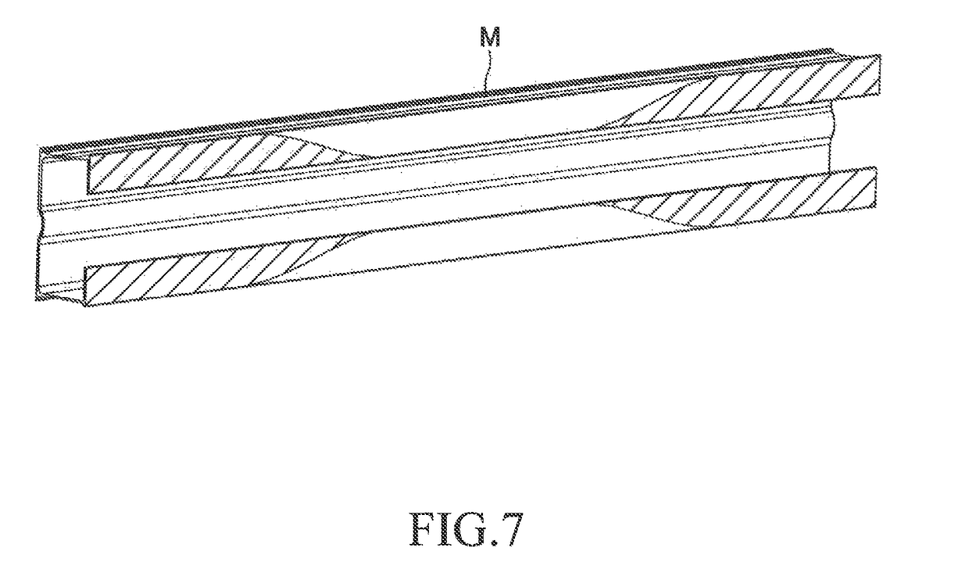
FIG. 7 is a perspective view of an intermediate body of a body portion of the bumper reinforcement.

The body portion 30 is formed as follows. First, a metal material (such as an aluminum material) is extruded to be formed into a straight intermediate body M as illustrated in FIG. 7. A direction of extruding the metal material corresponds to the vehicle width direction. That is, the intermediate body M is formed to extend in the vehicle width direction. A cross section of the intermediate body M, which is perpendicular to a longitudinal direction thereof, exhibits a shape similar to the cross section illustrated in FIG. 5. That is, the intermediate body M includes wall portions respectively corresponding to the upper wall portion 31, the lower wall portion 32, the front wall portion 33, the upper rear wall portion 34, and the lower rear wall portion 35. Next, right end portions and left end portions of the wall portions among the wall portions of the intermediate body M, which correspond to the upper rear wall portion 34 and the lower rear wall portion 35 (hatched portions in FIG. 7), are trimmed. Further, the through holes $HL1^{(30)}$ and $HL2^{(30)}$ and the through holes $HR1^{(30)}$ and $HR2^{(30)}$ are respectively formed in a left end portion and a right end portion of the wall portion among the wall portions of the intermediate body M, which corresponds to the front wall portion 33 of the body portion 30. Further, the through hole $HL3^{(30)}$ and the through hole $HR3^{(30)}$ are respectively formed in a left end portion and a right end portion of the wall portion among the wall portions of the intermediate body M, which corresponds to the upper wall portion 31 of the body portion 30. Next, a center portion of the intermediate body M in the vehicle width direction is bent into an arch shape. In this manner, the body portion 30 is formed.

The extending portion 40L is sandwiched between a left end portion of the body portion 30 and a front end portion of the side member 10L (see FIG. 6), and the extending portion 40R is sandwiched between a right end portion of the body portion 30 and a front end portion of the side member 10R.

Figure 8:
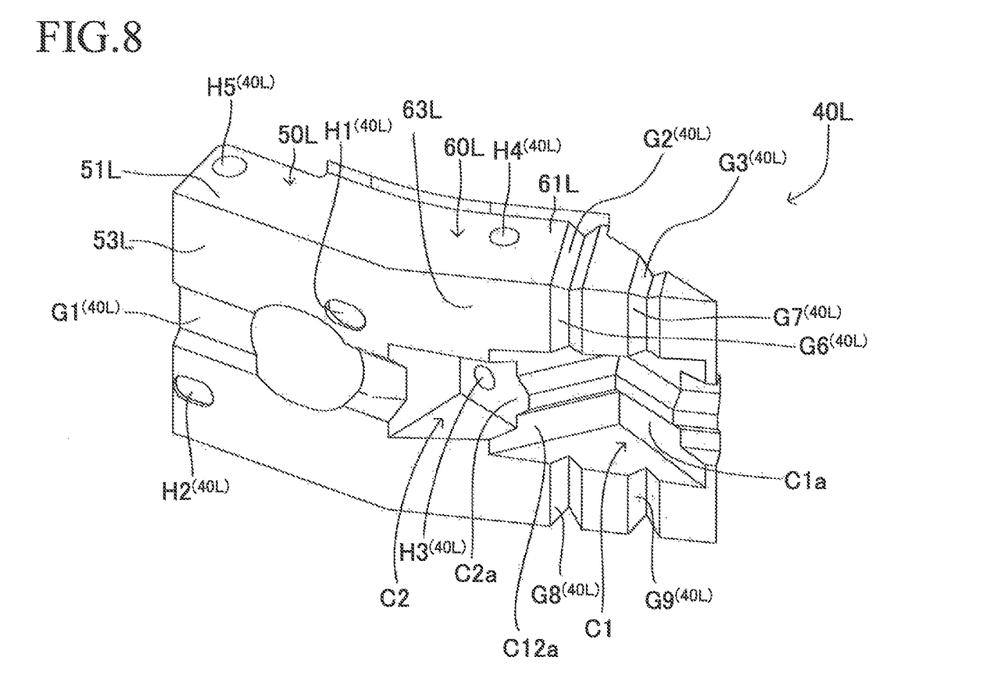
FIG. 8 is a perspective view of the left extending portion of the bumper reinforcement when viewed obliquely from a left front side.
Figure 9:
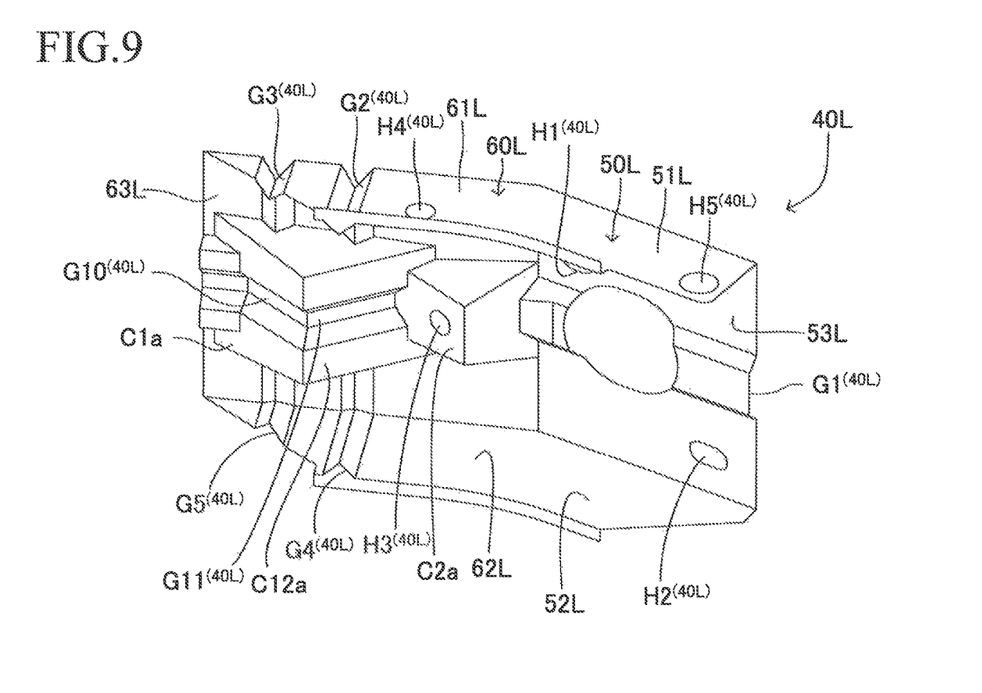
FIG. 9 is a perspective view of the left extending portion of the bumper reinforcement when viewed obliquely from a right rear side.

As illustrated in FIG. 8 and FIG. 9, the extending portion 40L includes a proximal end portion 50L to be assembled to the body portion 30 and the side member 10L under a state in which the extending portion 40L is overlapped with the left end portion of the body portion 30, and a protruding portion 60L being formed to extend leftward and rearward from the proximal end portion 50L and protruding from a left end of the body portion 30. An extending direction of the proximal end portion 50L coincides with an extending direction of the left end portion of the body portion 30. On the other hand, an extending direction of the protruding portion 60L is inclined with respect to the extending direction of the body portion 30. In other words, the extending portion 40L is curved in plan view. The curvature of the vicinity of the boundary portion between the proximal end portion 50L and the protruding portion 60L is larger than the curvature of the body portion 30.

The proximal end portion 50L includes an upper wall portion 51L and a lower wall portion 52L each having a plate shape substantially parallel to the upper wall portion 31 and the lower wall portion 32 of the body portion 30, respectively. Further, the proximal end portion 50L includes a front wall portion 53L having a plate shape substantially parallel to the front wall portion 33 of the body portion 30. A front end of the upper wall portion 51L is connected to an upper end of the front wall portion 53L, and a front end of the lower wall portion 52L is connected to a lower end of the front wall portion 53L. A dimension of the proximal end portion 50L in the vehicle height direction is slightly smaller than a distance between a lower surface of the upper wall portion 31 and an upper surface of the lower wall portion 32 of the body portion 30, and is slightly larger than a dimension of the front end of the side member 10L in the vehicle height direction. A groove portion $G1^{(40L)}$ extending in the vehicle width direction is formed in a center portion of a front surface of the front wall portion 53L in the vehicle height direction. A dimension of the groove portion $G1^{(40L)}$ in the vehicle height direction is slightly smaller than a dimension of the groove portion $G1^{(10L)}$ in the vehicle height direction, and is slightly larger than a dimension of the groove portion $G1^{(30)}$ in the vehicle height direction. Further, a depth of the groove portion $G1^{(40L)}$ is slightly smaller than a depth of the groove portion $G1^{(10L)}$, and is slightly larger than a depth of the groove portion $G1^{(30)}$. That is, the dimensions of the respective groove portions are set so as to avoid interference between the respective groove portions when the extending portion 40L is sandwiched between the body portion 30 and the side member 10L (see FIG. 6).

The protruding portion 60L includes an upper wall portion 61L and a lower wall portion 62L each having a plate shape substantially parallel to the upper wall portion 31 and the lower wall portion 32 of the body portion 30, respectively. The upper wall portion 61L and the lower wall portion 62L are formed to extend leftward and rearward from left ends of the upper wall portion 51L and the lower wall portion 52L of the proximal end portion 50L, respectively. Further, the protruding portion 60L includes a front wall portion 63L having a plate shape formed to extend leftward and rearward from a left end of the front wall portion 53L of the proximal end portion 50L. A front end of the upper wall portion 61L is connected to an upper end of the front wall portion 63L, and a front end of the lower wall portion 62L is connected to a lower end of the front wall portion 63L.

A recessed portion C1 and a recessed portion C2 are formed in a center portion of a front surface of the front wall portion 63L in the vehicle height direction. The recessed portion C1 is formed in a left end portion of the protruding portion 60L, and the recessed portion C2 is adjacent to a right side of the recessed portion C1. A cross section of the recessed portion C1 and the recessed portion C2, which is perpendicular to the vehicle height direction, exhibits a stepwise shape. That is, a bottom wall portion C1a of the recessed portion C1 and a bottom wall portion C2a of the recessed portion C2 are each formed into a plate shape perpendicular to the vehicle front-and-rear direction. The bottom wall portion C1a is located rearward with respect to the bottom wall portion C2a.

In a left end portion of an upper surface of the upper wall portion 61L, there are formed groove portions $G2^{(40L)}$ and $G3^{(40L)}$ extending in a direction perpendicular to the extending direction of the protruding portion 60L. Further, in a left end portion of a lower surface of a lower wall portion 62L, there are formed groove portions $G4^{(40L)}$ and $G5^{(40L)}$ extending in the direction perpendicular to the extending direction of the protruding portion 60L. Further, groove portions $G6^{(40L)}$ and $G7^{(40L)}$ extending in the vehicle height direction are formed at a portion of a left end portion of the front surface of the front wall portion 63L, which is located above the recessed portion C1. Further, groove portions $G8^{(40L)}$ and $G9^{(40L)}$ extending in the vehicle height direction are formed at a portion of the left end portion of the front surface of the front wall portion 63L, which is located below the recessed portion C1. The groove portion $G2^{(40L)}$ and the groove portion $G6^{(40L)}$ are continuous to each other. Further, the groove portion $G3^{(40L)}$ and the groove portion $G7^{(40L)}$ are continuous to each other. The groove portion $G4^{(40L)}$ and the groove portion $G8^{(40L)}$ are continuous to each other. Further, the groove portion $G5^{(40L)}$ and the groove portion $G9^{(40L)}$ are continuous to each other. Further, a groove portion $G10^{(40L)}$ extending in the vehicle width direction is formed at the center portion of the rear surface of the bottom wall portion C1a in the vehicle height direction. A groove portion $G11^{(40L)}$ extending in the vehicle front-and-rear direction is formed at the center portion in the vehicle height direction of a right surface of an intermediate wall portion C12a connecting a right end of the bottom wall portion C1a and a left end of the bottom wall portion C2a. The groove portion $G10^{(40L)}$ and the groove portion $G11^{(40L)}$ are continuous to each other.

A through hole $H1^{(40L)}$ and a through hole $H2^{(40L)}$ respectively corresponding to the through hole $H1^{(10L)}$ and the through hole $H2^{(10L)}$ of the side member 10L are formed in the front wall portion 63L. Further, a through hole $H3^{(40L)}$ corresponding to the through hole $H3^{(10L)}$ of the side member 10L is formed in the bottom wall portion C2a. Further, a through hole $H4^{(40L)}$ corresponding to the through hole $H4^{(10L)}$ of the side member 10L is formed in the upper wall portion 61L. Further, a through hole $H5^{(40L)}$ corresponding to the through hole $H5^{(10L)}$ of the side member 10L is formed in the upper wall portion 51L.

The extending portion 40L and the extending portion 40R are bilaterally symmetrical to each other. That is, the extending portion 40R includes a proximal end portion 50R having a shape bilaterally symmetrical with the proximal end portion 50L, and a protruding portion 60R having a shape bilaterally symmetrical with the protruding portion 60L. The extending portion 40R has through holes $H1^{(40R)}$ to $H5^{(40R)}$ similar to the through holes $H1^{(40L)}$ to $H5^{(40L)}$.

The extending portion 40L and the extending portion 40R are each integrally formed by pressing a metal plate.

The body portion 30, the extending portion 40L, and the extending portion 40R are mounted on the side members 10L and 10R as follows. First, respective members are arranged so that the extending portion 40L and the extending portion 40R are sandwiched between left and right end portions of the body portion 30 and the front ends of the side members 10L and 10R, respectively. In this state, the body portion 30, the extending portion 40L, and the side member 10L are overlapped with one another (see FIG. 6). Specifically, the front surface of the front wall portion 53L of the extending portion 40L is held in abutment against a rear surface of the left end portion of the front wall portion 33 of the body portion 30. Further, the front surface of the right front wall portion $F_R$, which forms the front end surface of the terminal end portion 12L of the side member 10L, is held in abutment against a rear surface of the front wall portion 53L of the extending portion 40L. Further, the front surface of the left front wall portion $F_L$, which forms the front end surface of the terminal end portion 12L of the side member 10L, is held in abutment against a rear surface of the bottom wall portion C2a of the extending portion 40L. The body portion 30, the extending portion 40R, and the side member 10R are also overlapped with one another similarly to the body portion 30, the extending portion 40L, and the side member 10L. Further, positions of the respective members are finely adjusted so that the through holes formed correspondingly to each other are overlapped with each other.

Next, bolts are inserted into the respective through holes, and distal ends of the bolts are fastened to the respective nuts arranged on the terminal end portion 12L and the terminal end portion 12R. In this manner, the body portion 30, the extending portion 40L, and the extending portion 40R are mounted on the side members 10L and 10R. In this state, the rear surfaces of the bottom wall portions C1a of the extending portions 40L and 40R are located in front of the front end surfaces 131L and 131R of the projecting portions 13L and 13R, respectively. Further, the rear surfaces of the bottom wall portions C1a of the extending portions 40L and 40R are parallel to the front end surfaces 131L and 131R of the projecting portions 13L and 13R, respectively.

When an object W collides against an end portion of the vehicle in the vehicle width direction (for example, a left end portion) from the front side, a distal end portion of the side member 10L is deformed to be compressed in the vehicle front-and-rear direction. Then, the rear surface of the bottom wall portion C1a is brought into abutment against the front end surface 131L of the projecting portion 13L. The rigidity of a portion of the side member 10L, on which the projecting portion 13L is mounted, is set smaller than the rigidity of the projecting portion 13L. Therefore, the distal end portion of the side member 10L is bent rightward. When the object W penetrates further rearward, the rear surface of the bottom wall portion C1a is brought into abutment against the inclined surface 132L of the projecting portion 13L. With this, the distal end portion of the side member 10L is pressed rightward, and the distal end portion of the side member 10L is further bent rightward. Then, the side member 10L is brought into abutment against an engine, a transmission, or the like (not shown). With this, the vehicle is moved in a direction away from the object W (rightward). That is, a vehicle cabin can be moved away from the object W.

As described above, the body portion 30 is elongated by the extending portion 40L and the extending portion 40R in the vehicle width direction. The extending portion 40L (40R) is formed by pressing a metal plate. Thus, the curvature of the boundary portion between the proximal end portion 50L (50R) and the protruding portion 60L (60R) of the extending portion 40L (40R) can be set larger than the curvature of the body portion 30, which is formed by extruding an aluminum material. That is, the curvature of the bumper reinforcement 20 can be set locally larger. Therefore, the degree of freedom in designing the front end portion of the vehicle (in particular, right and left end portions) is increased.

Further, the recessed portion C1 is formed in the extending portion 40L (40R). The bottom wall portion C1a of the recessed portion C1 is formed into a flat plate shape. Further, the bottom wall portion C1a is parallel to the front end surface 131 L of the projecting portion 13L. Therefore, in small overlap collision, when the distal end portion of the side member 10L (10R) is deformed to be compressed in the vehicle front-and-rear direction, the bottom wall portion C1a is first brought into surface contact with the front end surface 131L (131R) of the projecting portion 13L (13R). With this, the projecting portion 13L (13R) is pressed rearward. Also when the object W penetrates further rearward, the bottom wall portion C1a is brought into surface contact with the inclined surface 132L (132R) of the projecting portion 13L (13R). With this, the projecting portion 13L (13R) is pressed rightward (leftward). As described above, the bottom wall portion C1a is brought into surface contact with the front end surface 131L (131R) and the inclined surface 132L (132R) of the projecting portion 13L (13R). Thus, local deformation of the protruding portion 60L (60R) or the projecting portion 13L (13R) can be suppressed, thereby being capable of efficiently transmitting a collision load to the projecting portion 13L (13R).

Further, the plurality of groove portions $G1^{(40L)}$ to $G11^{(40L)}$ ($G1^{(40R)}$ to $G11^{(40R)}$) are formed in the extending portion 40L (40R). With this, the strength of the extending portion 40L (40R) can be improved. That is, when the extending portion 40L (40R) presses the projecting portion 13L (13R), deformation of the extending portion 40L (40R) can be suppressed.

Further, solid projecting members need not be assembled to the body portion 30 unlike the above-mentioned related-art bumper reinforcement, and hence the bumper reinforcement 20 is lightweight as compared to the related art. Therefore, a vehicle to which the bumper structure 1 is applied is easily steered as compared to a vehicle to which the above-mentioned related-art bumper reinforcement is applied. That is, the steering stability of the vehicle can be improved.

In addition, the present disclosure may be carried out without being mited to the above-mentioned embodiment. Various modifications may be made without departing from the object of the present disclosure.

For example, the above-mentioned bumper structure 1 is an example where the present disclosure is applied to a front end portion of a vehicle. Alternatively, the bumper structure according to the present disclosure may be applied to a rear end portion of the vehicle. Further, for example, the number and the direction of the respective groove portions of the extending portion 40L (40R) may be changed.

A feature of the present disclosure resides in a bumper structure (1), including: a bumper reinforcement (20) including: a hollow body portion (30) extending in a vehicle width direction of a vehicle; and an extending portion (40L (40R)) arranged on one end portion of the hollow body portion in a longitudinal direction of the hollow body portion; and a side member (10L (10R)) which is formed to extend in a vehicle front-and-rear direction of the vehicle, and is configured to support one end portion of the bumper reinforcement in a longitudinal direction of the bumper reinforcement, in which the extending portion includes: a proximal end portion (50L (50R)) to be sandwiched between the one end portion of the hollow body portion in the longitudinal direction of the hollow body portion and one end portion of the side member in a longitudinal direction of the side member; and a protruding portion (60L (60R)) formed to extend outward from the proximal end portion in the vehicle width direction, in which the side member includes a projecting portion (13L (13R)) protruding outward in the vehicle width direction, and in which, when an object collides against one end portion of the vehicle in the vehicle width direction to break the one end portion of the side member in the longitudinal direction of the side member, the protruding portion of the extending portion is abuttable against the projecting portion of the side member.

In this case, it is preferred that the hollow body portion be formed by extruding a metal material, and that the extending portion be formed by pressing a metal plate.

According to this configuration, in small overlap collision, when a distal end portion of the side member is deformed to be compressed in the vehicle front-and-rear direction, the extending portion presses the projecting portion. Then, the distal end portion of the side member is bent inward in the vehicle width direction, and is brought into abutment against a power unit (engine, transmission, or the like), and the power unit is pressed by the side member. With this, a vehicle body is moved in the vehicle width direction. That is, a vehicle cabin can be moved away from the object.

Further, the bumper reinforcement is divided into the body portion and the extending portion. Thus, the curvature of the body portion and the curvature of the extending portion are set different from each other, thereby being capable of forming bumper reinforcements having various shapes. For example, it is assumed that the body portion is formed by extruding a metal material, thereby being difficult to significantly and locally bend the body portion. Even in such a case, when the extending portion is formed by pressing a metal plate, the curvature of the extending portion can be set larger than the curvature of the body portion. That is, the curvature of right and left end portions of the bumper reinforcement can be locally increased. Therefore, the degree of freedom in designing the front end portion of the vehicle (in particular, right and left end portions) is increased.

Further, a solid projecting member need not be assembled to the body portion unlike the above-mentioned related-art bumper reinforcement, thereby being capable of reducing the weight of the bumper reinforcement. Therefore, a vehicle to which the present disclosure is applied is easily steered as compared to a vehicle to which the above-mentioned related-art bumper reinforcement is applied. That is, the steering stability of the vehicle can be improved.

Further, another feature of the present disclosure resides in that an abutment surface of the projecting portion of the side member against the protruding portion of the extending portion is formed into a flat surface shape.

In this case, it is preferred that the abutment surface of the projecting portion include: a first flat surface (131L (131R)) opposed to the extending portion; and a second flat surface (132L (132R)) extending from the first flat surface in an outward direction along the vehicle width direction, and in a direction away from the extending portion.

According to this configuration, in the small overlap collision, when the distal end portion of the side member is deformed to be compressed in the vehicle front-and-rear direction, the extending portion and the projecting portion are brought into surface contact with each other. Therefore, local deformation of the extending portion or the projecting portion can be suppressed, thereby being capable of efficiently transmitting a collision load to the projecting portion.

Further, still another feature of the present disclosure resides in that the extending portion has a groove portion ($G1^{(40L)}$ to $G11^{(40L)}$ ($G1^{(40R)}$ to $G11^{(40R)}$)).

In this case, it is preferred that the extending portion have a plurality of the groove portions.

According to this configuration, the strength of the extending portion can be improved. That is, when the extending portion presses the projecting portion, the deformation of the extending portion can be suppressed.

What is claimed is:
1. A bumper structure, comprising:
 a bumper reinforcement comprising:
  a hollow body portion extending in a vehicle width direction of a vehicle; and an extending portion arranged on one end portion of the hollow body portion in a longitudinal direction of the hollow body portion; and a side member, which is formed to extend in a vehicle front-and-rear direction of the vehicle, and is configured to support one end portion of the bumper reinforcement in a longitudinal direction of the bumper reinforcement, wherein the extending portion comprises:

a proximal end portion to be sandwiched between the one end portion of the hollow body portion in the longitudinal direction of the hollow body portion and one end portion of the side member in a longitudinal direction of the side member; and a protruding portion formed to extend outward from the proximal end portion in the vehicle width direction, wherein the side member comprises a projecting portion protruding outward in the vehicle width direction, and wherein, when an object collides against one end portion of the vehicle in the vehicle width direction to break the one end portion of the side member in the longitudinal direction of the side member, the protruding portion of the extending portion is abuttable against the projecting portion of the side member.

2. A bumper structure according to claim 1, wherein the hollow body portion is formed by extruding a metal material, and
wherein the extending portion is formed by pressing a metal plate.

3. A bumper structure according to claim 1, wherein an abutment surface of the projecting portion of the side member against the protruding portion of the extending portion is formed into a flat surface shape.

4. A bumper structure according to claim 3, wherein the abutment surface of the projecting portion comprises:
a first flat surface opposed to the extending portion; and
a second flat surface extending from the first flat surface in an outward direction along the vehicle width direction, and in a direction away from the extending portion.

5. A bumper structure according to claim 1, wherein the extending portion has a groove portion.

6. A bumper structure according to claim 5, wherein the extending portion has a plurality of the groove portions.

* * * * *